United States Patent [19]
Winters

[11] 3,941,092
[45] Mar. 2, 1976

[54] PET SANITIZER

[76] Inventor: Paul A. Winters, 2609 Clark Road, Tampa, Fla. 33618

[22] Filed: Dec. 5, 1974

[21] Appl. No.: 529,952

[52] U.S. Cl. .................... 119/19; 119/158; 119/160
[51] Int. Cl.² .......................................... A01K 29/00
[58] Field of Search ..... 119/17, 19, 15, 1, 158–160, 119/99; 220/4 R, 4 B

[56] References Cited
UNITED STATES PATENTS

| | | | |
|---|---|---|---|
| 1,335,629 | 3/1920 | Woodema | 119/160 |
| 1,714,635 | 5/1929 | Schaefer | 119/160 X |
| 1,760,017 | 5/1930 | Smoot | 119/158 X |
| 2,536,943 | 1/1951 | Kessel | 119/158 X |
| 3,023,734 | 3/1962 | Schaub | 119/99 |
| 3,028,839 | 4/1962 | Crook et al. | 119/99 X |
| 3,156,213 | 11/1964 | Patter | 119/19 |
| 3,850,144 | 11/1974 | Springer et al. | 119/19 |

Primary Examiner—Louis G. Mancene
Assistant Examiner—J. N. Eskovitz
Attorney, Agent, or Firm—Gary L. Manuse

[57] ABSTRACT

A multipurpose portable animal care unit is disclosed which serves as a pet sanitizer. The unit comprises a container having a displaceable cover and having a rigid wall structure including a plurality of orifices which are selectively opened or closed by a corresponding plurality of displaceable closures. The unit is, in the alternative, usable to either bathe and scrub or to rinse or to fumigate an animal placed therein. Additionally, the unit may also serve as a convenient, practical means to transport the animal. Means are also provided to accommodate varying sized animals in the unit.

2 Claims, 6 Drawing Figures

PET SANITIZER

BACKGROUND OF THE INVENTION

1. Field of the Invention

The invention generally relates to a portable apparatus for treating household pets and more particularly to such apparatus for alternatively bathing, rinsing or fumigating such household pets, or for transporting such pets.

2. Description of the Prior Art

A great many devices are known which provide means for treating animals placed therein, either for purposes of washing, grooming, or fumigation. These devices appear to be deficient in that none of them is adapted to treat a variety of animal sizes within a single unit which may be used to scrub and bathe, or rinse, or fumigate such animals. Additionally, no such prior devices show such a single unit which is also portable and rigid enough to serve as a means for firmly retaining and for transporting whatever animals may be placed therein.

SUMMARY OF THE INVENTION

It is therefore an object of the present invention to provide a simple apparatus comprising a single unit which will serve to transport, bathe and scrub, rinse, and fumigate an animal placed therein.

It is a further object of this invention that such a unit be adaptable to conveniently handle various sized animals.

It is another object of this invention to provide such a unit which is sufficiently rigid to contain and restrain the animal being treated or transported.

Accordingly, the present invention overcomes the disadvantages of the prior art devices by providing a structurally simple unit comprising a container having a rigid, open-top structure for receiving animals for treatment. The opening in the container top provides access to the interior of the container for inserting and removing animals to be treated. A cover is mounted to the container for movement between a lowered position which closes the opening and a raised position which permits access to the opening. A pair of recesses are formed in the container and cover, respectively, which recesses, when the cover is in its lowered position, mate to form a passage for receiving the neck of any animal in the container allowing that animal's head to remain exterior of the container. A plurality of spaced orifices are disposed throughout the entire peripheral wall structure of the container and at least one orifice is disposed in the container cover. Means are also provided for selectively opening and closing those orifices. Finally, a drain is disposed in the container wall proximate the bottom of the container.

DESCRIPTION OF THE PREFERRED EMBODIMENT

Figure 1:
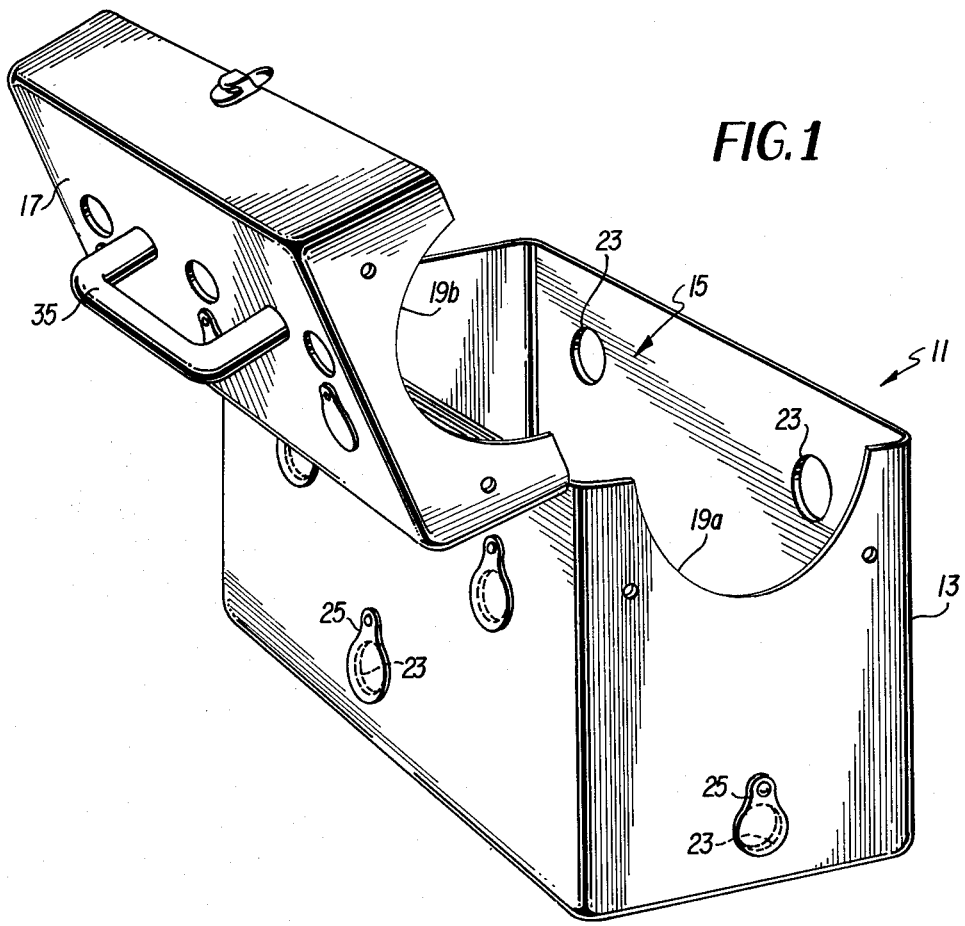
FIG. 1 is a perspective view of the pet sanitizer, an animal care unit incorporating the subject invention, with the cover in the raised position.

Referring to the drawings, FIG. 1 shows the pet sanitizer, an animal care unit embodying the subject invention. More particularly, the animal care unit 11 comprises a container 13 having a rigid peripheral wall structure and an open top 15 through which animals to be treated in the unit are inserted or removed. A cover 17 is mounted to the top of the container 13 adjacent the opening 15. The container 13 and cover 17 may be made of an opaque or translucent polyethylene type material. Alternatively, a transparent material may be employed to facilitate treatment of the animal by enabling a user to view the animal through the unit's structure during treatment.

Figure 2:
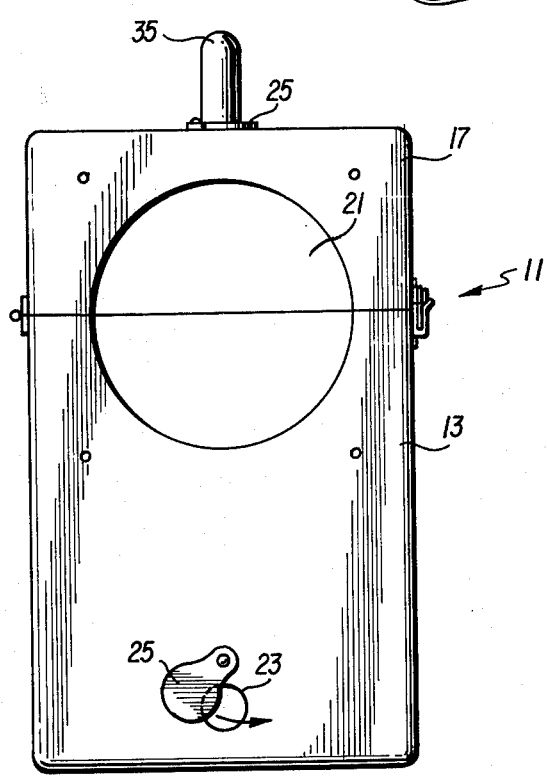
FIG. 2 is an end elevation view of the unit in FIG. 1 with the cover in the lowered position.

The cover is adapted to move between a raised position shown in FIG. 1, where the unit 11 is open and access can be had to the opening 15, and a lowered position (see FIG. 2), where the unit 11 is closed and no access can be had to the opening 15. A recess 19a is provided along the top of one end wall of the container 15. A corresponding recess 19b is provided in the corresponding end of the cover 17. When the cover 17 is in its lowered position, recesses 19a and 19b mate to form a passage 21 (see FIG. 2) in the unit 11. When the body of an animal is inserted in the open container, the recess 19a receives the neck of the animal and the animal's head is permitted to extend to the exterior of the container. Thereafter, when the cover 17 is moved to its lowered position, the animal's neck is firmly retained within the passage 21 thus formed and the animal's movements are thus limited. With the animal so restrained, both treatment and transport of the animal within the unit 11 are facilitated.

To provide communication between the interior and exterior of the container for the various treating fluids used on the animal being treated therein, a plurality of spaced orifices 23 (only some of which are noted) are disposed throughout the entire container periphery defined by the rigid walls of the unit 11. A corresponding plurality of closures (25) are mounted to the container exterior proximate the orifices 23. The closures 25 are adapted to be displaceable so that they may be moved into and out of a blocking relationship with the orifices 23 thereby to either prevent or permit the passage of treating fluids through those orifices. In a particular embodiment, the closures 25 may be disc-shaped members having a diameter greater than the diameter of the circular orifices 23. The discs may be pivotally mounted so that they pivot, about a fixed point, into and out of blocking relationship with the closures 23. The orifices 23 and closures 25 can be disposed both in the container 13 and in the cover 17.

Figure 3:
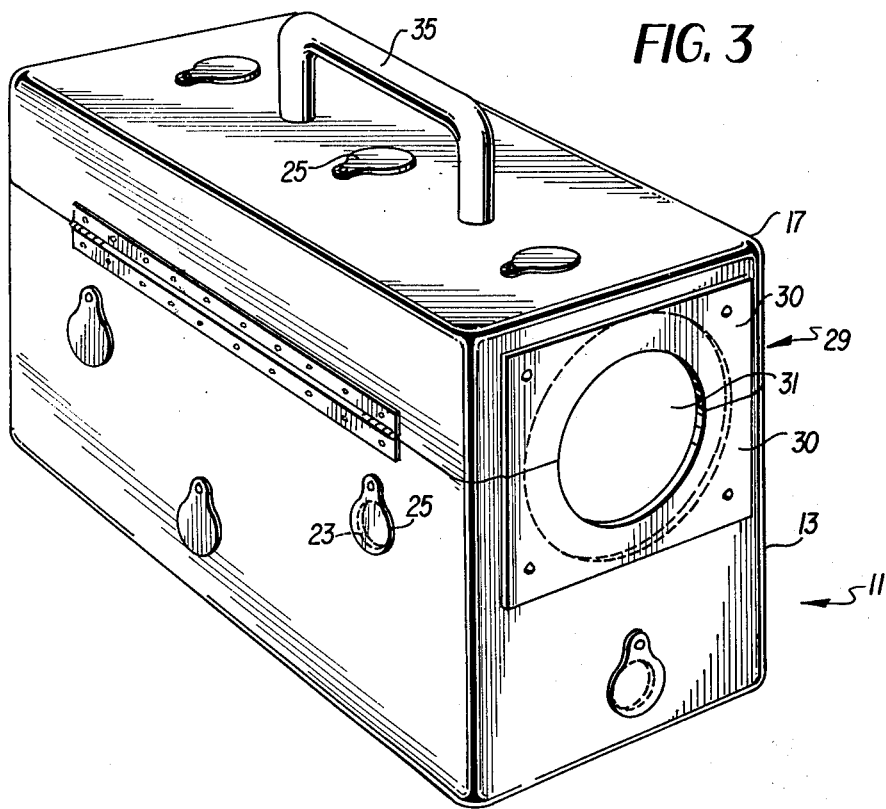
FIG. 3 is a perspective view similar to FIG. 1, but with the cover in the closed position and with an adaptor plate assembly mounted over the container passage.
Figure 5:
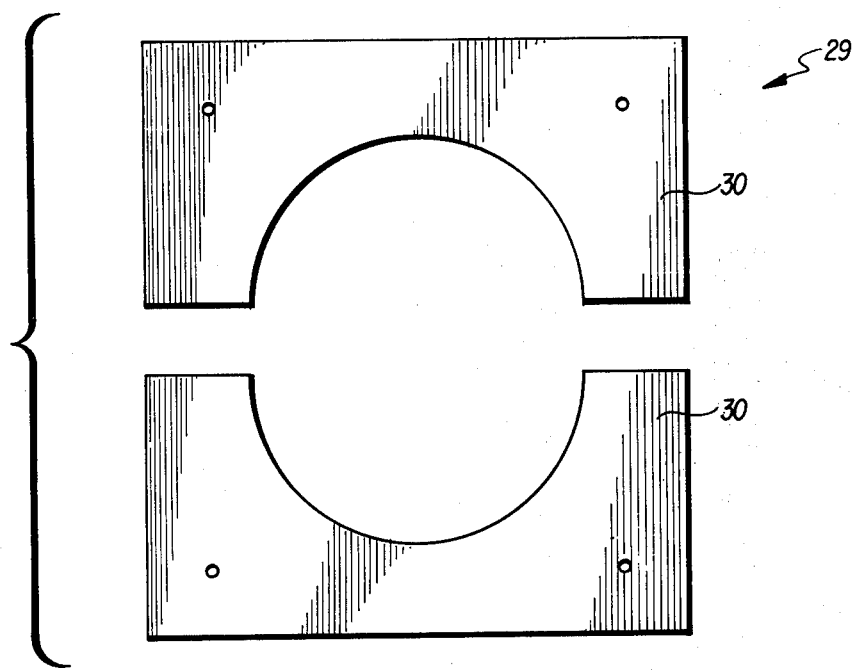
FIG. 5 is a front elevation view of a two-piece adaptor plate assembly for use in conjunction with the unit.
Figure 6:
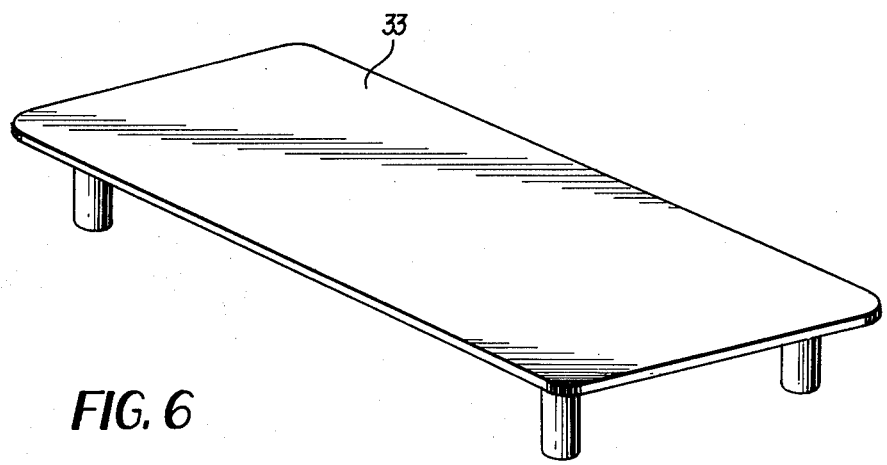
FIG. 6 is a perspective view of a raised platform used in conjunction with the unit.

As shown in FIG. 3, to accommodate various sized animals in a single sized animal care unit, a rigid adapter plate assembly 29 is utilized to reduce the diameter of the container passage 21. The assembly comprises a pair of adapter similar plate members 30, shown in detail in FIG. 5. Each plate member 30 has a similar recess disposed along one of its edges. The plate members are mounted, respectively, to the cover and to the container, at the end of the unit containing the passage 21. The plate members 30, so mounted, are oriented so that when the cover 17 is moved to its lowered position, the adapter plates will abut and their respective recesses will mate to form a circular or other shaped passage 31 which mates with, but which is dimensionally smaller than the passage 21. If desired, the mating passages 21 and 31 may be coaxially aligned. In any case, by using the rigid adapter plate assembly 29, smaller-necked animals can be readily and firmly retained in the animal care unit. Additionally, small-sized animals are supported in the unit, as shown in FIG. 4, by means of an elevated platform 33 (see FIG. 6) which is disposed in the bottom of the container 13.

To facilitate portability of the unit, a handle 35 is provided which is supported on the cover 17. Additionally, any conventional locking means may be provided to interlock the cover to the container.

Figure 4:
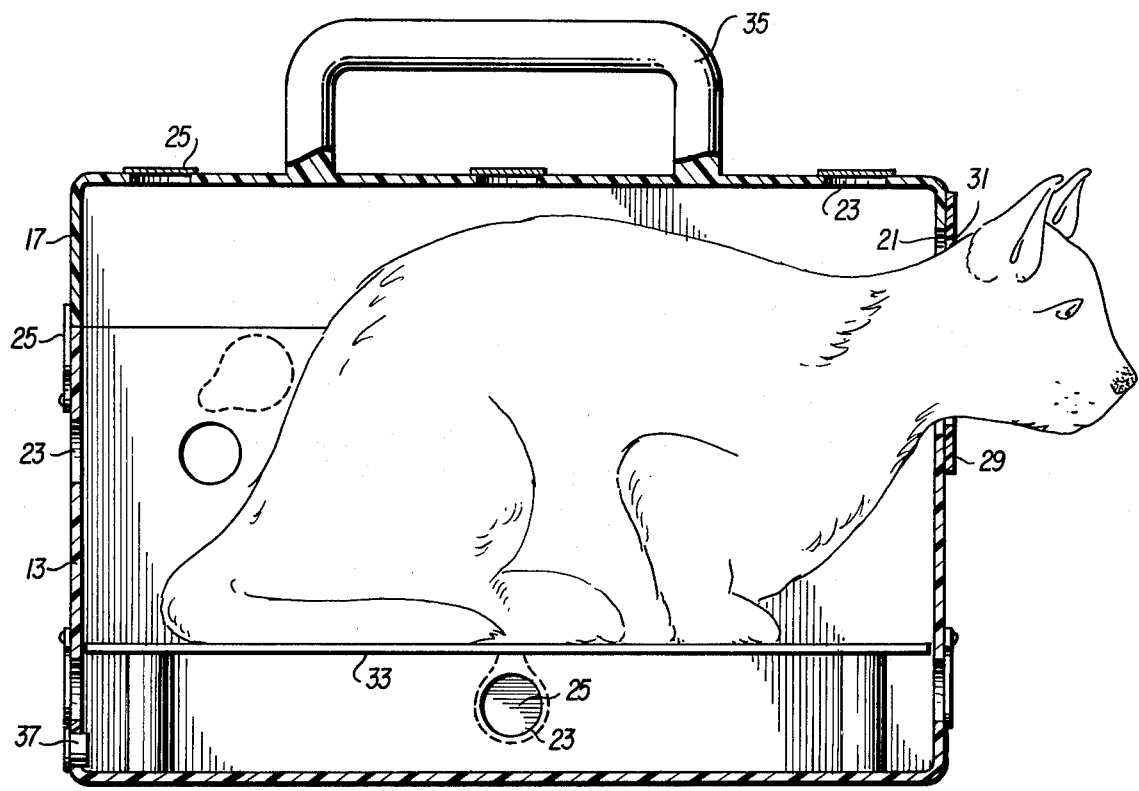
FIG. 4 is an elevation view in section of the unit shown in FIG. 3, with an animal disposed therein and supported on a raised platform.

Finally, a drain 37 is provided in one end wall of the container proximate the container bottom to eliminate accumulated fluids which have been used in treating the animal in the container (see FIG. 4).

In the operation of this unit, initially the size of the animal is compared with the animal care unit. Assuming that the animal will fit within the animal care unit, if the animal is substantially smaller than the unit, an appropriate sized platform 33 is disposed in the bottom of the container 13 to support the animal to be inserted therein. Cognizance is taken of the neck size of the animal and appropriately sized adapter plate members 30 are then mounted to the container and cover end proximate the container passage 21. Subsequently, when it is desired to bathe and scrub the animal, all of the discs 25 are moved into blocking relationship with respect to the orifices 23. Water or other cleaning fluid is applied to the animal and it is scrubbed. The water or other cleaning fluid then accumulates in the container 15. During this procedure, the cover 17 is left in its upright position to permit free and total access to the animal.

When it is desired to rinse the animal off, the drain plug 37 is opened to drain the accumulated fluid from bathing and scrubbing. Subsequently, a rinsing spray is applied, either through the container opening 15, or, if the cover is closed to confine the animal's movement, through the orifices 23 which have been opened by displacing the discs 25 from a blocking relationship. The drain plug 37 may be left open to allow the rinse water to pass through the container and then out.

After the animal has dried, it may be desirable to apply a fumigant. This is achieved by opening one or more of the orifices 23. Subsequently, the cover 17 is moved to its lower position so that the adapter plate assembly 29 is closed about the neck of the animal. The cover can then be locked to the container. Now fumigant is applied to the animal by spraying it inwardly into the container through the open orifices 23. The fumigant will permeate the atmosphere of the container and delouse or otherwise treat the animal. Once the fumigant has been applied, all of the orifices may be blocked off to retain the fumigant within the unit and permit such fumigant to act on the animal in the unit. After the fumigation procedure is completed, the cover may be opened and the animal may be removed.

It is clearly evident from FIG. 4, that by having a plurality of orifices spaced throughout the container cover and periphery, only selected ones need to be opened at any given time to permit application of washing, rinsing, or other treating fluids through such open orifices and against the body portions of the animal directly adjacent such open orifices. By such direct application of such fluids, the directly adjacent body portions of the animal are effectively treated.

The animal care unit, by virtue of its rigidity and its handle, is convenient for transporting any animal supported therein. Because the unit can be adapted to comfortably fit an animal therein, the animal will be generally firmly restrained and not have unnecessary freedom of movement as the container unit is moved. Moreover, the rigidity of the container will provide additional support.

While having shown and described a particular embodiment of my invention, it will be understood that various changes and modifications may be made, thereto, without departing from the spirit and scope of my invention as defined in the appended claims.

What I claim is:

1. A multipurpose animal care unit for transporting bathing, rinsing, and fumigating an animal, comprising:
   a. an open-top container including a rigid wall defining the container periphery, said container receiving the body of the animal;
   b. a cover adapted for mounting on said container to open and close the open top of said container;
   c. a pair of opposed recesses formed respectively in said container and said cover, whereby when said cover is in its closed position, said recesses mate to form a passage for receiving the neck of the animal and allowing its head to remain outside of said container;
   d. said cover having at least one orifice and said container wall having a plurality of orifices disposed in spaced relationship throughout the entire container periphery so as to provide direct access to all body portions of the animal;
   e. means for selectively opening and closing said orifices comprising a corresponding plurality of displaceable closures, respective ones of closures connected with the exterior wall of said container proximate said orifices; and
   f. said container wall having a drain opening proximate the bottom of said container, whereby a fluid may be directed into said container through selective ones of said orifices to treat body portions of the animal adjacent said selective orifices.

2. The animal care unit of claim 1 further comprising:
   a. an adapter plate assembly having a passage therein smaller than said passage in said container, said assembly removably mounted to said container so that said assembly's passage communicates with said passage in said container, said assembly comprising a pair of similar plate members, each plate member having a recess along one of its edges, said plate members mounted respectively on said container and said cover, with said recesses in said plate members mating to form said passage in said assembly; and
   b. a removable platform adapted to be placed on the floor of said container so as to elevate the level at which said animal is supported therewithin,
   whereby the animal care unit facilitates the treatment of varying sized animals with a single basic unit.

* * * * *